United States Patent [19]
Gjestrum

[11] Patent Number: 5,199,003
[45] Date of Patent: Mar. 30, 1993

[54] METHOD AND APPARATUS FOR RELEASE OF A SEISMIC ARRAY, ESPECIALLY STREAMERS IN THE EVENT OF OVERLOADING

[75] Inventor: Einar Gjestrum, Baerums Verk, Norway

[73] Assignee: Geco A.S., Stavanger, Norway

[21] Appl. No.: 798,724

[22] Filed: Nov. 29, 1991

[30] Foreign Application Priority Data

Nov. 29, 1990 [NO] Norway .................................. 905187

[51] Int. Cl.[5] .............................................. G01V 1/38
[52] U.S. Cl. ...................................... 367/20; 439/152
[58] Field of Search ........................ 367/20, 19, 18, 17, 367/16, 15, 4, 153, 154; 114/247, 253; 440/34; 439/152, 153

[56] References Cited

U.S. PATENT DOCUMENTS

| | | | |
|---|---|---|---|
| 4,541,079 | 9/1985 | Thigpen | 367/19 |
| 4,707,046 | 11/1987 | Strand | 439/314 |
| 4,823,325 | 4/1989 | Cole, Jr. | 367/20 |
| 4,928,262 | 5/1990 | Neeley et al. | 367/19 |

FOREIGN PATENT DOCUMENTS

| | | |
|---|---|---|
| 0325338 | 7/1989 | European Pat. Off. . |
| 0344850a3 | 12/1989 | European Pat. Off. . |
| 2165404A | 4/1986 | United Kingdom . |
| 2174556A | 11/1986 | United Kingdom . |

Primary Examiner—Ian J. Lobo
Attorney, Agent, or Firm—Jacobson, Price, Holman & Stern

[57] ABSTRACT

Release device for a cable used during seismic surveys at sea and towed through the water behind a vessel so that in the event of the occurrence of obstacles or other occasions when it is desirable to release the cable (1) from the towing vessel, a controlled release of the cable is possible so that it is not severed, but can be recovered for further use. At one or more locations in such cables release sections (2) are inserted which contain sensors which sense loading in the section and in the event of overloading or other occasions when release is desirable, an element (5) is activated which cause a release mechanism (6) to be activated and thereby causes a split in the cable (1) at a predetermined location.

18 Claims, 2 Drawing Sheets

METHOD AND APPARATUS FOR RELEASE OF A SEISMIC ARRAY, ESPECIALLY STREAMERS IN THE EVENT OF OVERLOADING

The invention relates to a method and an apparatus for release of an array from a towing vessel in the event of overloading or obstacles which affect the array or other occasions when it is desirable to release the array, for use especially in seismic surveys at sea and particularly for use in connection with seismic receiver cables such as streamers.

BACKGROUND OF THE INVENTION

During seismic surveys at sea long arrays are towed behind vessels through the water, comprising both energy sources, i.e. transmitters for seismic signals, as well as arrays consisting of the seismic recording equipment, which is placed in so-called streamer cables. Arrays of both this type and other types of array towed through the water can become overloaded from time to time, obstacles can get in the way of the array or quite simply there can be an urgent need to release the array for one reason or another. In such situations there is a risk that the array can be lost, in that e.g. it can take in water and sink. There is a special problem in connection with seismic arrays and particularly arrays of streamer cables, where electronic conductors and other equipment wiring are threaded through the whole cable up to the towing vessel. If such cables are severed due to overloading because an obstacle gets in the way, extremely valuable equipment can be lost, because, amongst other reasons, such cables are heavier than water and will therefore sink.

Several methods have therefore been developed in order to recover such severed streamer cables and the related towed equipment. Examples of recognized techniques can be found, e.g., in U.S. Pat. Nos. 4,541,079 and 4,823,325. In these recognized devices the principle has been applied that when a cable is severed, a supply of compressed gas is automatically released which will inflate the cable thus enabling it to float up to the surface and be recovered. This kind of activation of a gas supply can be released by radio signals and the cable can also be equipped with radio beacons, so that it can be recovered.

Such devices, however, constitute a complication of the cable and mean that extra equipment has to be installed which can complicate the construction of an already complicated cable. Furthermore, it has the significant disadvantage that the cable itself will be destroyed, thus preventing it from being used again.

BRIEF SUMMARY OF THE INVENTION

Thus the basic object of the present invention is to provide a releasing device together with a method for release particularly for a towed cable, where in the event of overloading or when obstacles are encountered, a release of the cable will be initiated at a predetermined location, in such a way that a deliberate division of the cable is performed without tearing it apart.

A further object of the invention is to provide a method and an apparatus for releasing a cable in a simple way while it is in the water, either in order to avoid danger or because it is desirable, e.g., to transfer the cable to another towing vessel or transfer it to another location.

These objects are achieved by a method and an apparatus which are characterized by the features described below.

According to the invention, there are inserted in the cable, preferably at regular intervals, so-called release sections, which either automatically or manually, in the event of an overload or when required, can be activated in such a manner that the rear section of the cable is disengaged and remains lying in the water. Since this release is performed at a defined location, it is also possible to equip the cable with buoyancy chambers or with simple buoyancy devices, chambers which will not be destroyed if the cable is severed, thus ensuring that the cable remains afloat and can be recovered.

According to the invention there are various elements which can be used to trigger the release. The most likely triggering factor is for the release mechanism to be activated due to overloading or stretch in the cable. Further triggering factors can be emergency situations, the appearance of an obstacle in the way of the equipment, or the necessity of moving the equipment or the cable for purely practical reasons. It is thus a simple matter to disengage the release section and avoid the imminent problems. The third triggering factor can be damage which occurs, e.g. by an obstacle. This could cause stretching leading to release of the cable or an obstacle which is entangled in the cable and which can be seen will be rendered less dangerous by releasing the cable so that the obstacle is no longer in danger of destroying the cable. A fourth triggering factor can be depth considerations. An array will also often be towed at a certain level under the surface in order to maintain a certain depth. For this purpose the towing cable is equipped with a head section, a so-called "lead in" which is a heavy object which can also be equipped with controls to regulate its operating depth. If a fault should occur in this, so that the head section steers the cable down to the bottom, problems can be avoided by activating the release mechanism, thus enabling the streamer cable to remain on the surface.

With regard to the actual construction of the apparatus, many possibilities can be envisaged within the scope of the invention. A brief list of alternatives could include a solution with loose screwing, release of a hook, use of magnetic forces and application of a knife, scissors or saw arrangement, e.g. with rotating edges. All these mechanisms can be released both hydraulically, pneumatically and electrically.

One of the principal advantages of the invention is also that the release point is situated in the actual cable, i.e. the release is performed within the array itself, either automatically or by remote control from the towing vessel.

BRIEF DESCRIPTION OF THE DRAWINGS

The invention will be now described in more detail with reference to the embodiments illustrated in the accompanying drawings wherein.

DETAILED DESCRIPTION

Figure 1:
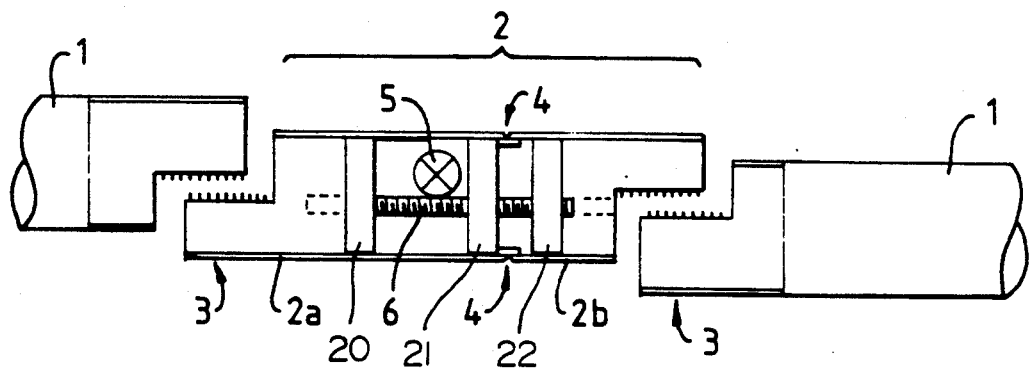
FIG. 1 is a diagrammatic representation of an embodiment where the release is performed by means of a screw which is driven by a motor.

FIG. 1 is a purely diagrammatic illustration of how a release device in accordance with a first embodiment of the invention can be constructed. Here only the general principle of the device is illustrated, in that the actual technical implementation will be carried out by the craftsman. In a streamer cable 1 which is towed behind a vessel a release section has been inserted which is given the general designation 2. This is connected in the usual manner in order to establish the transmission paths for electronic signals to and from the recording equipment and is also equipped with fluid passages of a known type. These connections are illustrated schematically with reference numbers 3. The actual section 2 in the embodiment of FIG. 1 is equipped with an inner screw 6. The housing for section 2 is made watertight at a severable joint 4. Parts 2a and 2b are kept together by screw 6 which passes through retaining fixtures such as plate members 20, 21 and 22 arranged in the section. In a situation where release is required, a motor 5 is activated which is installed in a waterproof chamber in section 2 and which will turn the screw 6 to the left, so that it is screwed out of part 2b. Thereby parts 2a and 2b are severed and all wiring within this section for the aforesaid transmission paths for electronic signals and aforesaid fluid passages within the section will thus also be severed, but this will be the only damage to occur. The portion of streamer which is thereby released may have buoyancy chambers which are either filled by the activity which is initiated or already contain buoyancy material to enable the streamer section to be recovered. An advantageous solution in this connection is to place this buoyancy medium in the release section 2 which can be, e.g., 2 m long. With this length of buoyancy section it will be possible to place the buoyancy medium and also the emergency beacon in the section, so that these will accompany the released cable.

The motor 5 can be an electrically-operated motor, but it can also use a hydraulic system for activating the screw.

To activate the release, a sensor, e.g., can be placed in the vicinity of the release section, which via a control system can either issue a warning that a release should be considered, or if a certain value is exceeded it can itself activate release.

After the cable has been released, another boat, e.g., can bring out a new, ready-calibrated streamer cable to the acquisition vessel, so that a minimum of operational time is lost during the actual seismic survey, in that the cable which has been lost can be quickly replaced while a reserve boat carries out the rescue of the cable.

Figure 2:
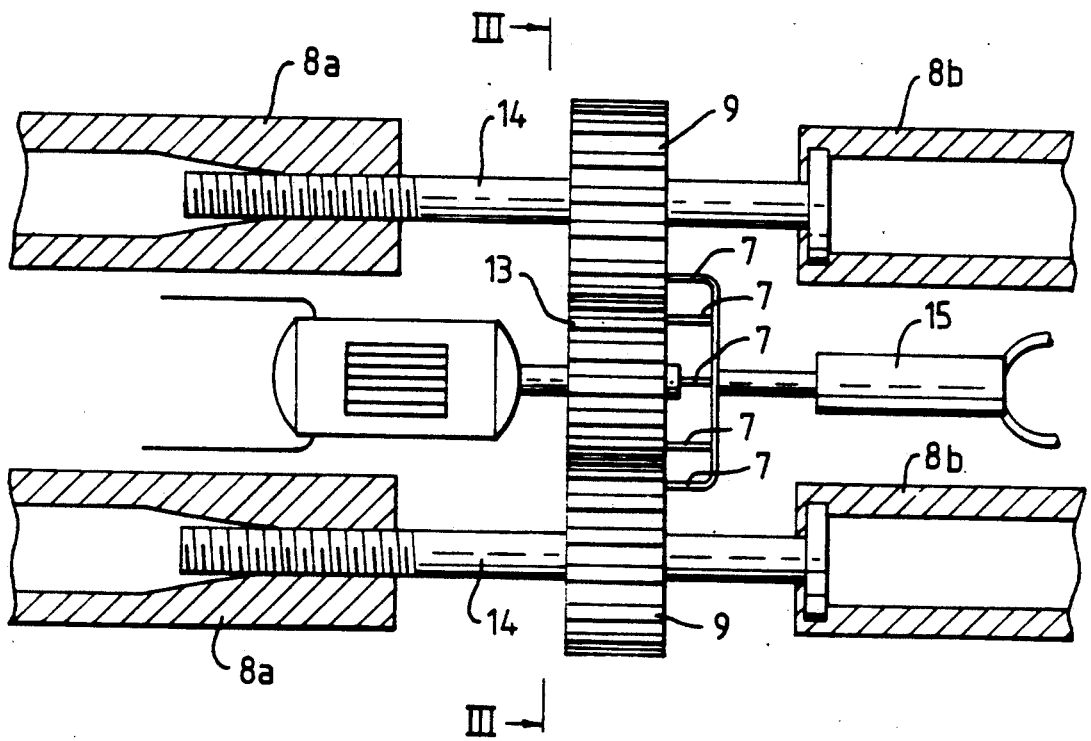
FIG. 2 is a schematic cross-sectional view of another embodiment of a release mechanism of the invention.

FIG. 2 illustrates another embodiment of the invention. The streamer cable itself is not shown in the drawing, in that this and also the next embodiment are based on a release or division of those stretch cables 8 which are threaded through a streamer cable. Normally there are three such cables, as illustrated in the figures, but a different number could also be envisaged, without affecting the release principle. In the figures, therefore, only these sections of the cable are illustrated.

Figure 3:
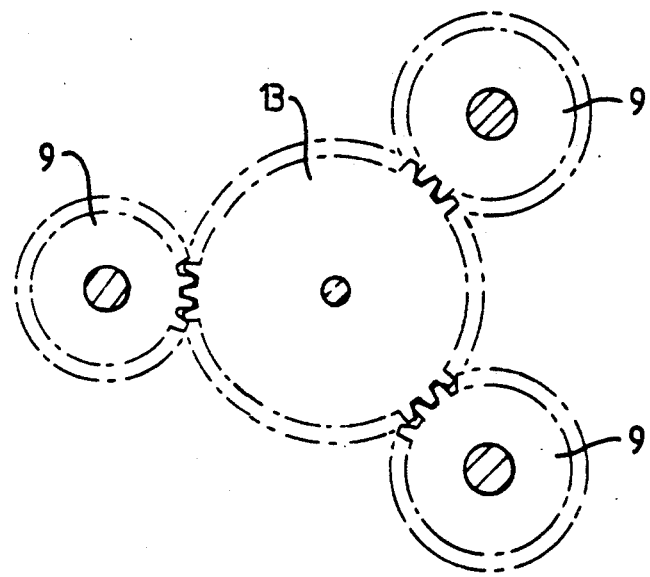
FIG. 3 is an outline of the gears taken along line III—III of FIG. 2.

The streamer cable's stretch cables on the two sides of the release mechanism are designated 8a and 8b respectively. These sections are connected by a shaft 14, on which are fitted, e.g. welded, cogwheels which are designated 9. In gear meshing relationship with these cogwheels 9 in the center of the cable is placed a further cogwheel 13, as best illustrated in FIG. 3. This cogwheel is mounted on the shaft from a motor 5, which serves to operate the release mechanism. The shafts 14 are permanently fitted in the stretch cables 8b on one side and screwed into the ends of the stretch cables 8a on the opposite side of the cogwheels. Between the cogwheels or in grooves in these, lock pins 7 can be inserted which prevent rotation of the cogwheels, as illustrated in FIG. 2. These lock pins are connected to a cylinder 15, which can be connected by a pulling mechanism to the outer cable section.

As an alternative solution, (not shown), instead of affecting the cogwheels, the lock pins can be constructed so that they block a rotation of the shafts 14.

When the release mechanism is activated, the cylinder 15 is pulled outwards, e.g. under the influence of tensile forces or by other means under the influence of a sensor or a release mechanism. This releases the cogwheel mechanism for rotation and at the same time will by recognized means deliver an impulse to the motor 5 causing this to start and turn the cogwheels in such a direction that the shafts 14 are screwed out of the stretch cable sections 8a, so that the two cable sections 8a and 8b are released from each other. Simultaneously with this process, the creation of, e.g., buoyancy gas can be effected in isolated portions of the streamer cable on both sides of the fracture, so that the ends of the cable are kept afloat.

In a simplified version of this solution the lock pins 7 can be omitted, so that when it is not in action, it is only the motor which blocks the mechanism.

Figure 4:
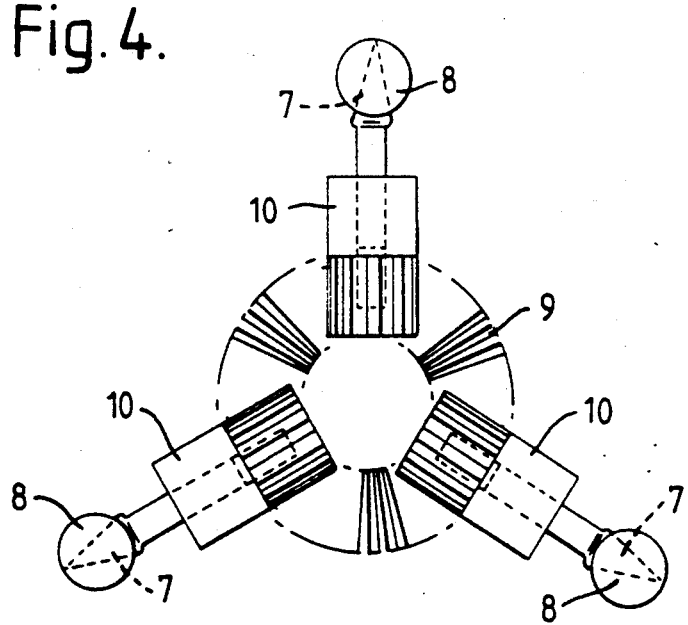
FIG. 4 is a schematic view of a further embodiment, showing a section of a release mechanism.
Figure 5:
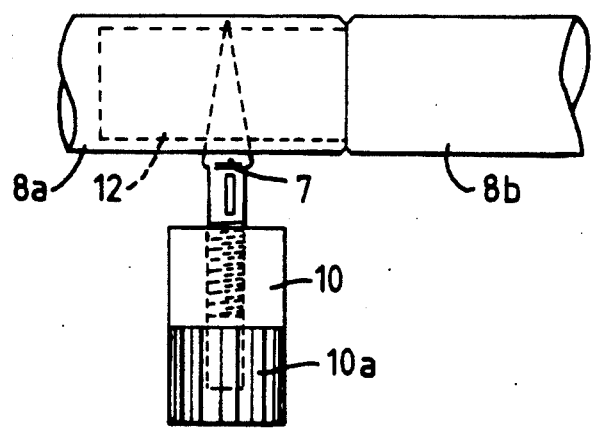
FIG. 5 is an enlarged partial slide view of the embodiment of FIG. 4.

FIGS. 4 and 5 show another variation, which is also based on division of the stretch cables in the streamer cable. In this example, as illustrated in FIG. 5, the two stretch cable sections 8a and 8b are connected by means of an insertable pin part 12 on section 8b, which is pushed into a corresponding hole at the end of section 8a. The two sections are kept together by means of a lock pin 7, as schematically illustrated in the two figures. In this connection is should be mentioned that this lock pin or lock bolt 7 is illustrated in an exaggeratedly conical shape. It is advantageous for pin 7 to be slightly tapered in order to facilitate release.

The lock pin 7 is fitted on to a shaft part with threads at the end, which is screwed into a lock housing or actuator 10, on the end of which is formed a toothed rim part 10a. This toothed rim part 10a is in gear meshing relationship with a cogwheel rim 9 which can be made to rotate by means of a motor (not shown), in a similar way to that described in the previous embodiment in FIGS. 2 and 3.

When the release mechanism is activated, the motor will make the cogwheel 9 rotate, and this again will rotate the lock housing 10 via the toothed rim 10a. Thereby the shaft part of lock pin 7 will be screwed into the housing and pull the pin out, thus releasing part 12, and thus releasing stretch wire parts 8a and 8b from each other.

The above illustrates a screw mechanism and two different solutions, where cogwheel mechanisms are used. It should be obvious that other mechanical solutions can be modelled on similar principles within the scope of the invention. Such solutions are not described here in detail, but should be able to be implemented and designed by a craftsman. As an example of how such mechanisms can be implemented, mention can be made of a releasable hook, in that two parts of a streamer cable can be joined together by means of a hook, which by means of a pulse or motor drive can be opened for release.

Another alternative is the use of magnetic gripping mechanisms, which make an electrical triggering or release possible, in that, e.g., a release pulse can activate a spool which provides a magnetic counterfield which weakens the binding magnetic forces to such an extent that the parts can be pulled apart. Other conceivable possibilities are that a motor operates a knife, scissors or saw device which when activated will cut through retaining or binding wires in the release section. It should therefore be obvious that many modifications will be possible within the scope of the invention.

I claim:

1. An apparatus for severing a cable towed behind a towing vessel in seismic surveys at sea comprising:
    a plurality of cable lengths forming said cable;
    connecting elements on ends of said cable lengths;
    at least one severable cable connector comprising two severable sections normally held together at a severable joint thereon and having opposite connector ends for connecting with said connecting elements on two adjacent cable lengths;
    a release mechanism on said at least one severable connector for normally holding said severable sections thereof together at said severable joint; and
    loading sensor means on said at least one severable connector for sensing a load on said cable and operatively connected to said release mechanism for operating said release mechanism for severing said two sections of said at least one connector at said severable joint when an overload condition is sensed by said loading sensor, so that said adjacent cable lengths are separated only at said severable joint of said at least one connector due to said overload.

2. The apparatus as claimed in claim 1 wherein:
    said at least one cable connector comprises a housing;
    said severable joint is on said housing; and
    said release mechanism is mounted within said housing and connected to said two severable sections so that said two severable sections are retained together by said release mechanism during normal loading conditions and releases said two sections in response to said loading sensor detecting said overload for separating said at least one connector at said severable joint.

3. The apparatus as claimed in claim 1 and further comprising:
    a chamber in at least one of said severable sections of said at least one connector; and
    a buoyancy medium in said chamber.

4. An apparatus as claimed in claim 3 and further comprising:
    a radio beacon transmitter in said chamber for transmitting a radio beacon upon severance of said at least one connector.

5. The apparatus as claimed in claim 1 wherein said release mechanism comprises:
    at least one screw threaded shaft means in said at least one connector connecting said two severable sections together for normal use; and
    remotely controllable driving means engaged with said screw threaded shaft means for rotating said at least one shaft means in response to said overload detected by said loading sensor for releasing said at least one screw threaded shaft means between said two severable sections.

6. The apparatus as claimed in claim 1 wherein said cable lengths comprise seismic survey streamer cable sections having wiring for the transmission of electric signals and fluid passage means for the transmission of fluid pressures and further comprising:
    electrical connection means and fluid transmission means on said connecting elements on said cable lengths and on said connector ends of said at least one severable cable connector for connecting together to provide continuous electric and fluid transmission lines through said cable lengths when connected to said at least one severable cable connector, so that upon severing of said at least one severable cable connector said transmission lines are broken only in said at least one severable cable connector. r 7. The apparatus as claimed in claim 5, wherein:
    said at least one screw threaded shaft means comprises at least one first plate member disposed within and connected to one of said at least two severable sections, a second plate member disposed within and connected to the other of said two severable sections, a screw threaded shaft rotatably mounted in said at least one first plate member and threadably engaging said second plate member so that rotation of said screw threaded shaft in one direction draws said two severable sections toward each other, and rotation of said shaft in the other direction moves said two severable sections apart thereby releasing said screw threaded shaft from said second plate member and severing said two severable sections at said severable joint; and
    said remotely controllable driving means comprises motor means operatively engaging said screw threaded shaft for rotating said screw threaded shaft.

8. A method for releasing at least one cable towed behind a towing vessel in seismic surveys at sea comprising:
    providing a plurality of cable lengths for forming a continuous cable;
    connecting adjacent cable lengths together by a severable cable connector;
    providing a severable joint on said severable cable connector;
    maintaining said severable joint in a normally connected position by a release mechanism on said severable cable connector;
    sensing the load on the cable when in a connected position by a loading sensor; and
    controlling said release mechanism by said loading sensor to release said release mechanism when said loading sensor detects an overload on said cable thereby causing said severable cable connector to separate at said severable joint thereon so that said cable is severed only at said severable joint.

9. An apparatus for severing a main cable towed behind a towing vessel in seismic surveys at sea comprising:
    a plurality of cable lengths forming said cable;
    at least one severable section on said main cable joining adjacent cable lengths;
    a plurality of stretch cables within said cable lengths and having ends thereon adjacent said at least one severable section;

a release mechanism within said main cable adjacent said severable section and releasably connected to said stretch cables for normally holding said cable lengths together at said severable section; and loading sensor means in said main cable for sensing a load on said main cable and operatively connected to said release mechanism for operating said release mechanism for severing said at least one severable section when an overload condition is sensed by said loading sensor, so that said adjacent cable lengths are separated only at said at least one severable section due to said overload.

10. The apparatus as claimed in claim 9, wherein said release mechanism comprises:

a plurality of shafts, each shaft having opposite ends rotatably mounted in adjacent ends of one of said stretch cables of each of said adjacent cable lengths;

a screw threaded end on each of said shafts threadably connected to one of said stretch cables;

an outer cogwheel fixedly mounted on each shaft;

an inner driving cogwheel mounted between said plurality of shafts and operatively engaging said outer cogwheels on said shafts; and motor means operatively connected with said inner driving cogwheel for rotating said driving cogwheel;

said loading sensor means being operatively connected to said motor means for operating said motor means when an overload condition is sensed by said loading sensor means, so that said motor means rotates said inner driving cogwheel which rotates said outer cogwheels on said shafts to rotate said shafts to disengage said screw threaded connections between said shafts and corresponding stretch cables and allowing said at least one severable section to separate said adjacent cable lengths.

11. The apparatus as claimed in claim 10, and further comprising:

locking means releasably engagable with at least one of said cogwheels for preventing rotation thereof; and means for disengaging said locking means from said at least one of said cogwheels when said overload is detected.

12. The apparatus as claimed in claim 9, wherein:

said stretch cables in one of said severable sections have bore holes in the ends thereof;

said stretch cables in the other of said severable sections have end portions extending therefrom for releasable engagement within respective ones of said bore holes;

transverse aligned locking pin holes are provided in said stretch cables in said one of said severable sections and in said end portions in said other of stretch cables when said respective stretch cables are engaged with said end portions in said bore holes;

a plurality of circumferentially arranged substantially cylindrical actuators rotatably mounted within said main cable adjacent said severable section thereof and having axis of rotation extended radially;

a screw threaded bore co-axially disposed in each of said actuators;

a locking pin on each of said actuators having a screw threaded end engaging in said screw threaded bore of a respective actuator and an opposite tapered end insertable into said aligned holes in said stretch cables when engaged;

external gear teeth on each of said actuators;

a central driving gear having an axis of rotation transverse to the axis of rotation of said actuators and operatively engagable with said external gear teeth on said actuators so that rotation of said central gear simultaneously rotates said actuators; and motor means operatively connected to said central gear and said loading sensor means so that when said loading sensor means detects an overload condition said motor means is operated to drive said central gear to rotate said actuators for withdrawing said locking pins from said aligned locking pin holes whereby said end portions on said stretch cables of said other of said severable sections are released from said bore holes in said stretch cables in said one of said severable sections and said cable is separated at said at least one severable section only.

13. The apparatus as claimed in claim 9, wherein:

said release mechanism comprises a releasable hook means.

14. An apparatus as claimed in claim 9, wherein:

said release mechanism comprises a magnetic device.

15. The apparatus as claimed in claim 9, wherein:

said release mechanism a cutting means having a rotating cutting edge for cutting through said severable section when said loading sensor means detects an overload.

16. The apparatus as claimed in claim 9 and further comprising:

bouyancy means in ends of said cable lengths.

17. The apparatus as claimed in claim 10 and further comprising:

buoyancy means in ends of said cable lengths.

18. The apparatus as claimed in claim 12 and further comprising:

buoyancy means in ends of said cable lengths.

* * * * *

UNITED STATES PATENT AND TRADEMARK OFFICE
CERTIFICATE OF CORRECTION

PATENT NO. : 5,199,003
DATED : March 30, 1993
INVENTOR(S) : Einar Gjestrum

It is certified that error appears in the above-indentified patent and that said Letters Patent is hereby corrected as shown below:

On the Title page, item [21], delete Application No. "798,724" and insert -- 798,725 --.

Signed and Sealed this

Twenty-first Day of December, 1993

Attest:

BRUCE LEHMAN

*Attesting Officer*  *Commissioner of Patents and Trademarks*